Dec. 13, 1938.  W. A. MOULD  2,140,327
JOKE BEER
Filed March 5, 1938

INVENTOR.
WILLIAM ANGELL MOULD
BY
ATTORNEY.

Patented Dec. 13, 1938

2,140,327

UNITED STATES PATENT OFFICE 2,140,327

JOKE BEER

William Angell Mould, Loughborough Junction, Camberwell, London, England

Application March 5, 1938, Serial No. 194,034

8 Claims. (Cl. 272—8)

This invention relates to a trick or joke device which consists of the accurate imitation of a container of beer, with the exact color and foam, but in a form and package which permits of shipment without spilling, and the method of producing the same.

The principal object of the invention is to provide an imitation of a glass or mug of beer which is so accurate in its imitation that it cannot be easily picked out among a number of real containers of beer. When the beer is served with the "joke beer" included in a group, one of the guests will obviously pick up the "joke beer" and attempt to drink it; whereupon he will be embarrassed.

The construction of the item will be better disclosed by reference to the accompanying drawing, in which.

Figures 1, 2:
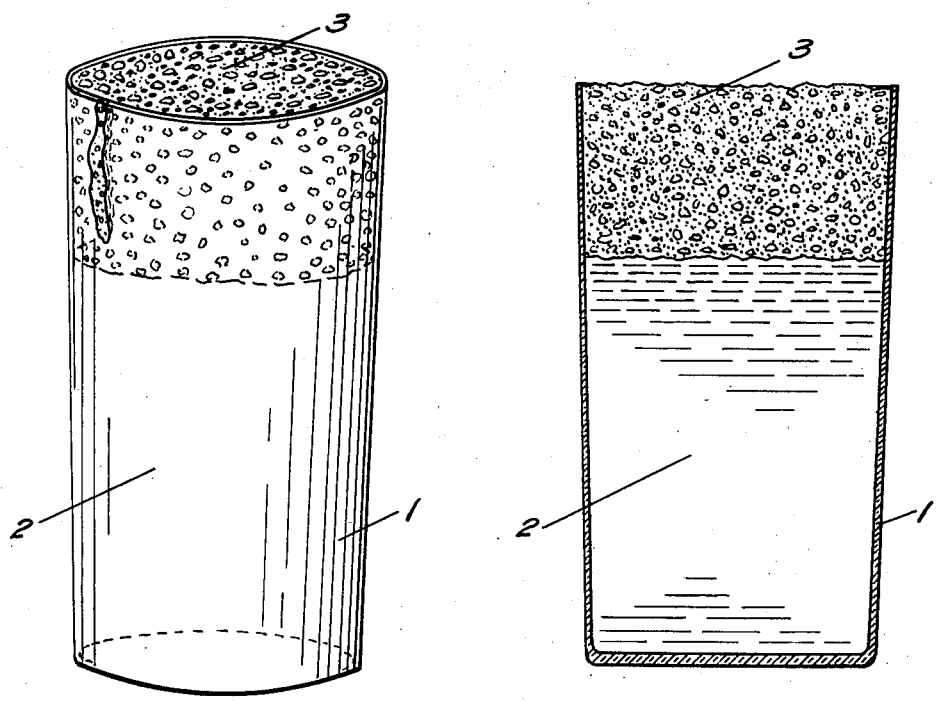
Figure 1 is a perspective view of the item.
Figure 2 is a vertical section taken on the line 2—2 in Figure 1.

In the drawing, 1 is a container which may be either a glass or mug. 2 is a liquid colored to imitate the natural color of beer. 3 is a foam imitating the natural foam of beer.

The principal invention lies in the composition of this foam, the method of making it and applying it to the surface of the colored liquid in the container.

The liquid in the container is preferably water colored with burnt sugar. The foam is preferably made from gelatine, to which is added bicarbonate of soda.

The process of making the foam consists of melting the gelatine in a double boiler, wherein it reaches a temperature of 212 degrees Fahrenheat, the boiling temperature of the water in the outer container of the double boiler, and while at this temperature, it is whipped with preferably an electric beater, to form the bubbles and thereby produce the foam.

This gelatine whip, if left to stand by itself, would settle back to a somewhat solid form; the bubbles and foam gradually disappearing.

To retain the foam in its desired form, bicarbonate of soda is added and whipped into the foam. This bicarbonate of soda produces the required color to imitate the beer foam, and has the property of preserving the bubbles in the foam. The mixture is then permitted to cool slightly, and at just the right point, it is poured upon the surface of the colored water, which has previously been placed in the container.

To produce the article desired, the container is filled to a point where there may be a slight overflow of the foam down the side of the container, in order to make it look as natural as possible. The gelatine foam with the bicarbonate of soda will stand at a uniform level over the top of the liquid, and will congeal into a permanent, natural appearing foam, which will harden in this form.

After it has hardened, the gelatine bicarbonate of soda foam forms a permanent seal to hold the liquid in the container, and the item may be shipped without fear of spilling or leakage.

It must be pointed out, however, that there is a very definite point at which the pouring of the foam onto the liquid must be accomplished.

The liquid is brought to a temperature of preferably 40 degrees Fahrenheit; however, it may range from 33 degrees to 50 degrees Fahrenheit. Within this range of temperature the liquid is cold enough to receive the gelatine foam without absorption or melting.

The foam after being whipped is brought to a temperature of preferably 60 degrees Fahrenheit, but this may range from 50 degrees to 70 degrees Fahrenheit, whereupon it is ready to be poured upon the surface of the liquid.

If the temperature of the foam is too high, it will streak down into the liquid and form a very unnatural appearance. Whereas, on the other hand, if the foam is too cold, it will solidify much too quickly, cannot be poured, and will not produce the natural appearance required.

Having described my invention, what I claim is new and desire to secure by Letters Patent is:

1. An imitation of a glass of beer, consisting of a container, colored liquid in the container, a seal to close the container consisting of an imitation foam which is made from gelatine and bicarbonate of soda.

2. An imitation of a glass of bear, consisting of a transparent container, colored liquid in the container, a seal to close the container consisting of an imitation foam which is made from gelatine and bicarbonate of soda.

3. An imitation drink consisting of a container, liquid material imitating the liquid of the drink and solid material imitating the foam mounted on the top of the said liquid, the said foam forming a seal with the container, the two being secured solely by surface adhesion.

4. An imitation drink consisting of a transparent container, a material imitating the drink mounted in the container and secured thereto solely by adhesion.

5. An imitation drink consisting of a container, material imitating the drink mounted in the container and secured thereto solely by adhesion.

6. An imitation glass of beer consisting of a container having material imitating the liquid and foam of a beer mounted therein.

7. An imitation glass of beer consisting of a container having material imitating the liquid and foam of the beer mounted therein, the said foam being attached to the container solely by adhesion.

8. An imitation of a glass of beer consisting of a container, liquid material imitating the liquid of the drink, and solid material imitating the foam mounted on the top thereof, the said foam forming a seal with the container, the two being secured solely by adhesion.

WILLIAM ANGELL MOULD.